United States Patent [19]
Beach, Jr.

[11] 3,797,920
[45] Mar. 19, 1974

[54] WIDE ANGLE MIRROR
[76] Inventor: Theodore L. Beach, Jr., P.O. Box 366, Donnelsville, Ohio 45319
[22] Filed: June 19, 1972
[21] Appl. No.: 263,925

[52] U.S. Cl.................. 350/303, 350/299, 350/307
[51] Int. Cl. ............................................. G02b 5/08
[58] Field of Search ........... 350/303, 304, 299, 288, 350/307

[56] References Cited
UNITED STATES PATENTS
2,663,225  12/1953  Blan ................................... 350/304
3,044,359  7/1962  Streccia ............................. 350/303
2,890,539  6/1959  Holt ................................... 350/303
3,644,021  2/1972  Hamby ............................... 350/304

Primary Examiner—John K. Corbin
Assistant Examiner—Michael J. Tokar

[57] ABSTRACT

Main and auxiliary mirrors are angularly disposed at an obtuse angle for viewing a trailing portion of an elongate or articulated vehicle during turning or parking operations thereof as well as traffic conditions at the rear of the vehicle during forward movement thereof.

7 Claims, 4 Drawing Figures

PATENTED MAR 19 1974 3,797,920
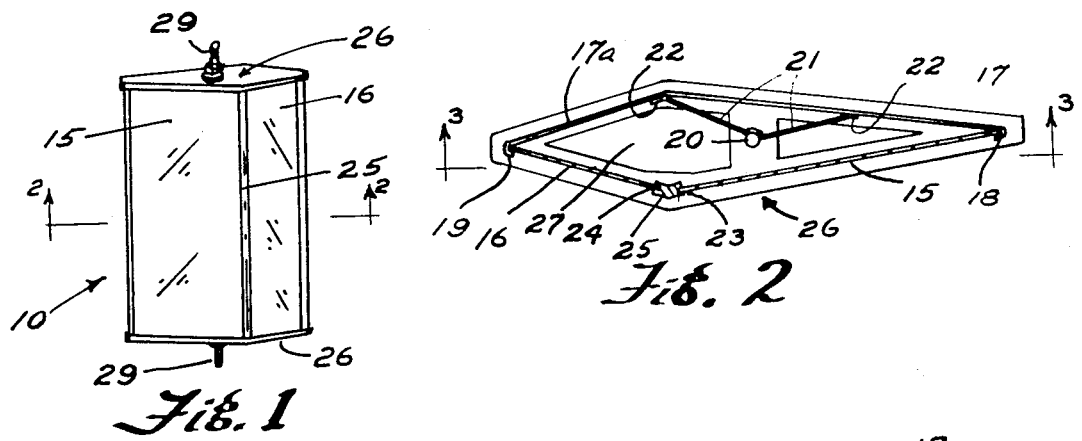
Fig. 1
Fig. 2
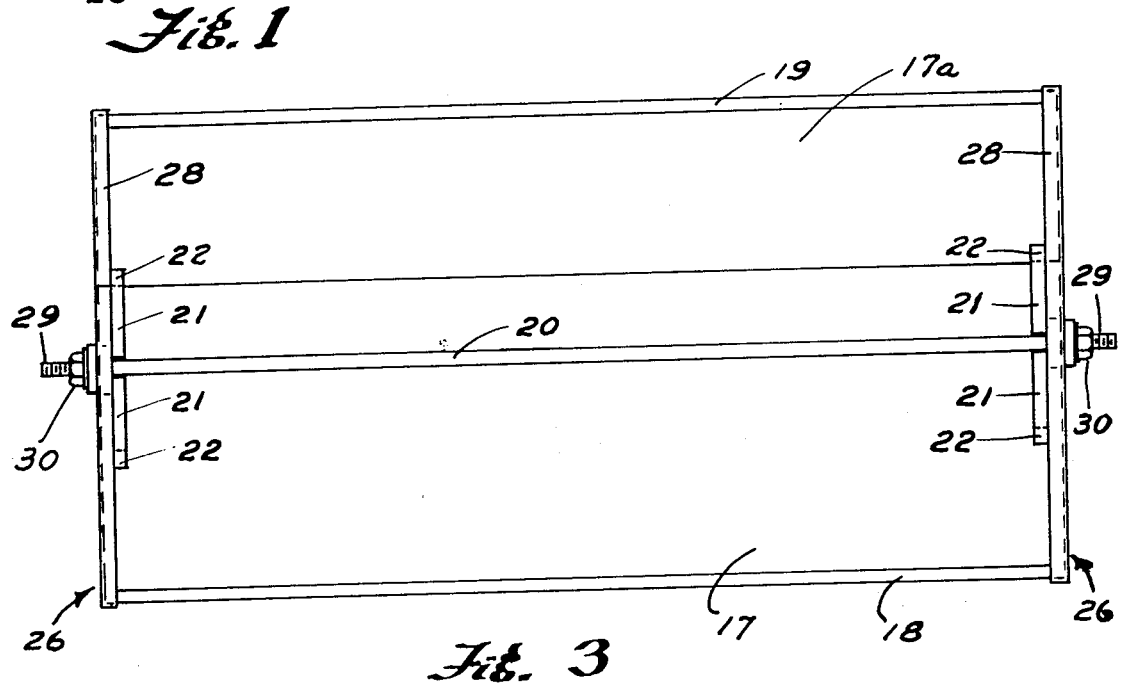
Fig. 3
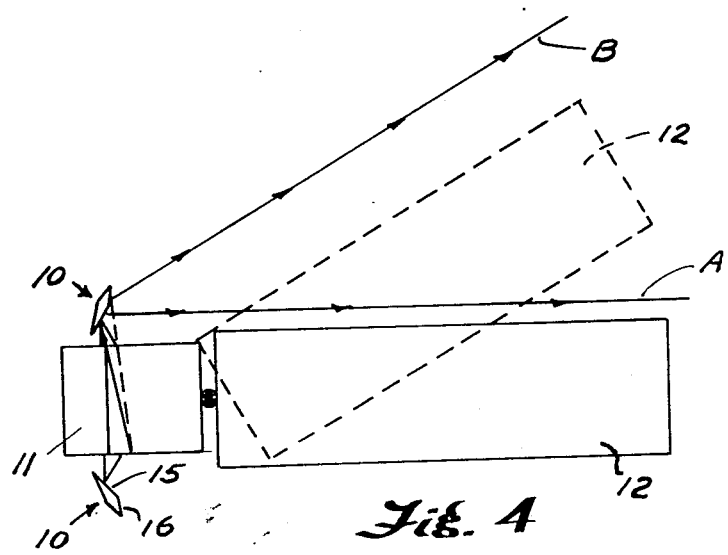
Fig. 4

WIDE ANGLE MIRROR

BACKGROUND OF THE INVENTION

The present invention relates to rear view mirrors for vehicles and, more particularly, to a mirror for observing trailing portions of an elongate or articulated vehicle such as a tractor-trailer type of truck during turning and/or parking operations thereof as well as observing traffic conditions to the rear of the vehicle during forward operation thereof.

Heretofore, serious and difficult problems have been encountered in attempting to provide a complete and accurate field of view for a driver of relatively large vehicles such as trucks, campers, tractor-trailers or auto-pulled house trailers.

During normal forward operation of such vehicles on a highway, conventional rear view mirrors mounted exteriorly of the cab provide an adequate view to the rear and side of the vehicle. However, at other times during both forward and backward operation of the vehicle, conventional rear view mirrors are not capable of providing rearward view to the extent that is necessary for safety.

For example, an adequate rearward view is impossible when a tractor and its trailer are angularly disposed relative to one another. Such condition is encountered in the making of an ordinary turn or in the backing of such vehicles to a loading dock and the like. Although mirrors are normally mounted on both sides of the vehicle, neither of such conventional mirrors will provide a view of the rear of the trailer when it is positioned angularly relative to the tractor.

Additionally, when merging with highway traffic from an access ramp, the driver of such a vehicle must make essentially a blind entry from the ramp because the view provided by a conventional mirror is of the ramp behind the vehicle instead of the traffic approaching on the highway.

Prior attempts to alleviate such problems have employed adjustable mirror systems and/or composite mirrors comprising planar and convex portions. Neither of these approaches is entirely satisfactory, and serious disadvantages are encountered with both. For example, an adjustable mirror system requiring frequent adjustment by the driver of the vehicle is not satisfactory since he needs both hands at all times during operation of the vehicle for steering and changing gears and the like. Curved mirror surfaces are undesirable because they provide an image that is distorted and inaccurate in a large portion of the field of view.

SUMMARY OF THE INVENTION

The foregoing and other problems and disadvantages connected with the prior art are overcome by the present invention which provides a pair of planar mirror surfaces for maximum accuracy and minimum distortion of the field of view throughout a wide angle. One of the mirror surfaces is used for viewing rearwardly under normal operating conditions, and the other mirror surface provides an accurate rearward view of a desired location or area under other conditions.

DESCRIPTION

Other features and advantages of the invention will become apparent from the following description taken in connection with the accompanying drawings in which:

FIG. 1 is a perspective view of a mirror assembly embodying the present invention;

FIG. 2 is a sectional view, looking in the direction 2—2 of the embodiment of FIG. 1;

FIG. 3 is a side elevational view of the embodiment of FIG. 1 with the mirror means omitted to show the interior structure; and FIG. 4 is a schematic plan view showing a tractor-trailer equipped with a mirror system embodying the present invention.

Referring to the drawings and particularly to FIG. 4 thereof, a mirror assembly in accordance with the present invention is indicated generally at 10 and is shown mounted on opposite sides of a tractor 11 and trailer 12. In FIG. 4 the solid lines show the normal configuration of the tractor and trailer during operation thereof on a highway and the dotted lines show the trailer 12 in angled relation to the tractor 11 such as occurs during the execution of turns and/or during maneuvering operations such as the backing of the vehicle to a loading dock.

Customarily, a mirror is mounted on each side of the tractor to provide the driver with a rear view of both sides of the tractor-trailer vehicle. With conventional mirrors, the line of sight of this rear view is generally parallel to the side of the vehicle as indicated by line A. Thus, conventional mirrors provide an adequate view along the side and at the rear of a vehicle during normal operation thereof but fail to provide a view of the rear portion of the trailer or the rear wheels thereof when the trailer is angulated relative to the tractor. In such case, the rear portion of the trailer is completely out of the field of view of the mirror mounted on the driver's side of the vehicle, and the view provided by the mirror mounted on the curb side of the vehicle is confined to the forward rather than the rearward portions of the trailer.

In accordance with the present invention there is provided a pair of planar mirrors 15, 16 relatively positioned to one another so that an obtuse angle is included between the respective planes of these mirrors.

A housing 17 formed of a single piece of sheet material such as aluminum, stainless steel, plastic or the like has one edge portion thereof folded upon itself to form a double-walled substantially U-shaped channel 18. As best shown in FIG. 2 housing 17 extends substantially in a straight line for approximately two-thirds of the width thereof and is then bent and extends in another straight line indicated at 17a. Straight portion 17a terminates in another integrally formed channel 19.

A shaft 20 extends substantially centrally through the device and has affixed thereto adjacent each end thereof pairs of arms 21 which in each case extend at an obtuse angle relative to one another and each of which is provided at its outer end with an integrally formed foot portion 22 which bears against the inner face of the housing. The outer side edges of planar mirrors 15, 16 are mounted in channels 18, 19, respectively, and their inner side edges are mounted in notches 23, 24, respectively, that are provided along the opposite sides of an elongated structural member 25.

There is also provided a pair of end pieces generally indicated at 26 and each having a generally flat body portion 27 of substantially the same cross sectional shape and size as the remainder of the device as is illustrated in FIG. 2 when the same is in assembled condition. The peripheral edges of the end pieces 26 are provided with inwardly extending integral flanges that are grooved or channeled to receive the end portions of the body 17, structural member 25, and mirrors 15, 16.

The end portions of shaft 20 are exteriorally threaded, is indicated at 29 for mounting the same on suitable brackets for attachment to the body of the cab 11.

In assembling the mirror of the present invention, the mirrors 15, 16 are first placed in channels 18, 19 and the opposite edges of these mirrors are placed in notches 23, 24 as shown in FIG. 2. The end pieces are then brought over the end portions of the mirror and casing to secure them in place. Nuts 30 are provided at both ends of shaft 20 and are then tightened to hold the end pieces 26 in their assembled condition. When so assembled, the inner face of the casing 17 bears against the feet 22 and the tension of arms 21 thus making the device compact, rattle-free and weather resistant.

Since both ends of rod 20 are provided with external threads 29, a single mirror construction is suitable for mounting on either side of the cab of a tractor 10. When so mounted, a driver of the vehicle utilizes mirror portion 15 to obtain an accurate rear view of the rearward portion of the trailer as well as of traffic conditions behind the trailer. During turning or parking operations, as well as when approaching a highway from an access ramp, auxiliary mirror portion 16 is utilized to provide the desired view along a line of sight indicated by the line B. Experience has shown that the obtuse angle included between the planar surfaces of mirrors 15, 16 should be about 165° to provide the desired field of view with most vehicles currently in use and will accommodate most of the possible configurations and provide the desired field of view when said angle is of the order of about 160° to about 170°.

While a particular embodiment of the invention has been illustrated and described, it will be obvious that various changes and modifications can be made without departing from the invention, and it is intended in the appended claims to cover all such changes and modifications which fall within the true spirit and scope of the invention.

What is claimed is:

1. A wide angle mirror assembly adapted to be mounted exteriorly of an elongate or articulated vehicle for viewing a trailing portion of said vehicle as well as traffic conditions to the rear and sides of said vehicle comprising a tube-like polyhedron consisting of
a body of flexible sheet material having integrally formed U-shaped channels facing each other and coextensive with the side edges of said body,
an elongate member spaced apart from said body and disposed between said channels and having notches coextensive with opposite sides of said member,
first planar mirror means mounted in one of said channels and in one of said notches,
second planar mirror means angularly disposed relative to the plane of said first mirror means and mounted in the other of said channels and in the other of said notches.
end members closing the ends of said polyhedron and receiving each end portion of said body, said elongate member and both mirror means, and
means interconnecting said end members.

2. A mirror assembly according to claim 1 wherein an obtuse angle is defined between the respective planes of said first and second mirror means.

3. A mirror assembly according to claim 2 wherein said angle is of the order of about 160° to about 170°.

4. A mirror assembly according to claim 2 wherein said angle is about 165°.

5. A mirror assembly according to claim 1 wherein said interconnecting means includes a member bearing against the inner wall of said body.

6. A mirror assembly according to claim 5 wherein said bearing member additionally bears against one of said end members.

7. A mirror assembly according to claim 1 wherein said interconnecting means is a shaft having a pair of divergent arms affixed thereto adjacent each end piece, and a foot portion formed integrally with each arm and bearing against the inner wall of said body.

* * * * *